Aug. 25, 1953   C. B. COLEMAN   2,650,003
DRIP ARRESTING APPARATUS
Filed March 8, 1948

INVENTOR.
CLARENCE B. COLEMAN
BY Joseph B. Sendney
atty.

Patented Aug. 25, 1953

2,650,003

UNITED STATES PATENT OFFICE 2,650,003

DRIP ARRESTING APPARATUS

Clarence Buyer Coleman, Oakland, Calif.

Application March 8, 1948, Serial No. 13,701

2 Claims. (Cl. 222—318)

This invention relates generally to the control of flow in fluid distribution systems.

An object of the invention is to provide, in conjunction with a circuit for conducting fluid under pressure between a pressure source and one or more outlets, means for promptly evacuating portions of said circuit when it is desired to stop discharge of fluid from said outlets so as to preclude subsequent drippage of fluid from the circuit through the outlets.

A further object of the invention is to provide, in apparatus of the character described, means affording instant control of flow so that unusually sharp cut-off of the discharge from the outlet or outlets may be effected even though the distance between the outlet and the nearest control valve may be considerable.

Another object of the invention is to provide flow control apparatus particularly adapted for use with horticultural spraying machines or crop-spraying airplanes in which it is essential that instant interruption of spray application be permissible in the event of sudden stoppage of advance movement of the machine or passage of the airplane beyond the borders of the area under treatment in order to prevent the application of harmful excessive amounts of spray material to the ground or growth, over which the machine may be halted, or in the case of airplane spraying, to adjacent areas which the spray material might harm.

Still another object of the invention is to provide, in a flow circuit of the character described, means for periodically reversing flow in the circuit so as to effect clearing from the discharge outlets and from filters which may be included in the circuit, any foreign matter or oversize solid particles which may be lodged in and which may tend to clog the outlets or filters.

A still further object of the invention is to provide, in a circuit of the type referred to, apparatus which will function to introduce air into the circuit so as to produce a desirable agitation of fluid solutions contained in the circuit which may have components which tend to precipitate from the liquid vehicle.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawings and description may be adopted within the scope of the invention as set forth in the claims.

Referring to the drawing.

The apparatus of my invention is capable of incorporation in and use with a wide variety of devices in which fluid flow is to be controlled, in the particular manner to be subsequently set forth, but I have chosen to describe the apparatus in connection with a horticultural spray implement such as a ground vehicle or airplane wherein the apparatus finds widespread use.

The use of chemical solutions in open fields for the control of pests, enrichment or conditioning of the soil, eradication of weeds or like purposes is becoming more prevalent. The solutions used however, in order to be sufficiently potent for an extended period after application, are quite concentrated and strong and more than ordinary care must be exercised in their distribution over the areas or growths to be treated. The most commonly employed apparatus for applying such solutions comprises a mobile unit, including a tractor or other powered transport vehicle such as an airplane on which is carried a header pipe, commonly referred to as a "boom" which is disposed in vertically spaced parallel relation with the ground and which may be moved, by the tractor or other vehicle, over the area to be treated. The boom is usually about ten or twelve feet in length or may extend over the entire wing span of the airplane, and is provided, at intervals of about six or eight inches, with spray nozzles from which the solution, introduced into the boom under pressure, may be discharged in jets of spray capable of coating the area traversed by the boom. Thus, by repeatedly traversing the area of a field, the latter may be completely covered in adjacent contiguous swaths.

As long as the transport vehicle is kept in motion or as long as the airplane is in superposed relation with the area, the spray will be substantially uniformly distributed over the area. However, if the forward progress of the ground vehicle and its associated boom must be suddenly stopped for any reason, the subsequent saturation with solution, caused by drippage from the spray nozzles, of any vegetable growth which may be directly under the nozzles will usually be very damaging or fatal to the growth. In the case where the spray is airplane-applied the shut-off must be made sometimes before the border of the area is reached so as to prevent prevailing wind from carrying the spray into adjacent areas which might be harmed by the solution which would be accidently deposited thereon.

Figure 1:
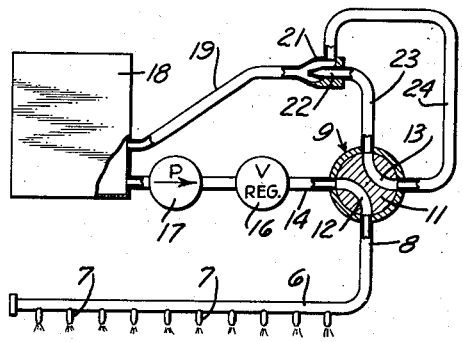
Figure 1 is a view, diagrammatic in character, of the preferred form of the apparatus of my invention showing the apparatus conditioned to deliver fluid under pressure to a utility duct herein shown as the spray head boom of a horticultural spraying machine.
Figure 2:
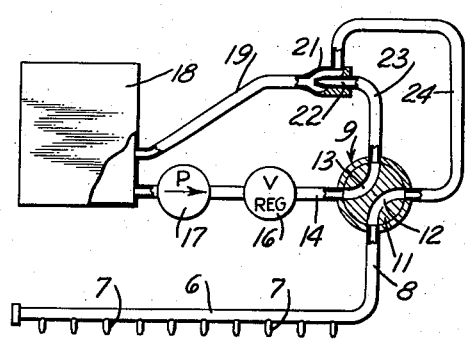
Figure 2 is a view, similar to Figure 1, showing the apparatus conditioned to evacuate the boom and arrest drippage from the spray heads.
Figure 3:
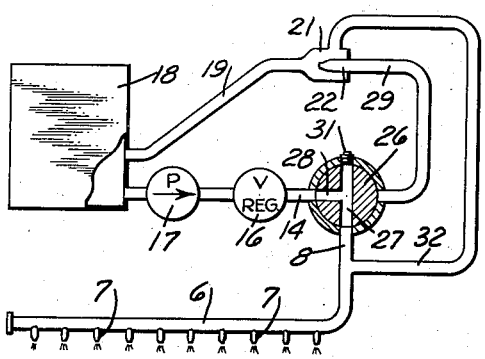
Figure 3 is a view similar to Figure 1, but showing a modified form of apparatus conditioned to deliver fluid to the spray head boom.
Figure 4:
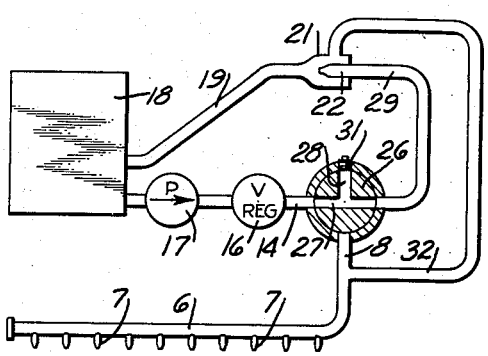
Figure 4 is a view similar to Figure 3 showing the modified form of apparatus conditioned to evacuate the spray head boom.

Attempts have been made in previously-proposed devices for controlling this drippage by providing manual shut-off or spring-actuated check valves in the individual spray nozzles, but such arrangements were not entirely successful because, in one case, difficulties may and usually do develop in the complicated control mechanism and, in another case, due to gradual lowering of the pressure in the manifold prior to closing of the check valves, some dripping is bound to occur. However, with the apparatus of my invention, such check valves may be successfully used since as will appear later, the pressure in the lines supplying the spray nozzles will instantly drop to zero when spraying is to be stopped.

I have succeeded, by the provision of a very simple arrangement of apparatus, in preventing such drippage, or drainage of the fluid content of the boom, through the nozzles whenever the boom-carrying vehicle is stopped or when the airplane approaches or traverses the border of the area. In Figure 1 is shown a pipe boom 6 having a series of discharge devices here shown as spray nozzles 7 associated therewith and through which liquid contained within the boom may be discharged. A portion of the boom, here shown as one end thereof, is connected through a conduit 8 with one outlet of a two-way valve 9 whose rotary plug member 11 has therein a pair of separate ducts 12 and 13 respectively arranged to connect adjacent pairs of the four peripherally disposed, equidistantly spaced ports with which the rotary plug member is provided. These ports are arranged to register and communicate with similarly arranged ports in the valve body. The port of the valve body disposed in clockwise adjacency to the port in communication with the conduit 8, as viewed in Figure 1, is connected to a conduit 14 running preferably through a constant-pressure regulator 16 to a force pump 17 arranged to draw liquid solution from a suitable storage tank 18. Instead of the regulator 16 a valved by-pass such as shown in Figure 6, may be used. Also connected with and to discharge into the storage tank 18 is an inlet conduit 19 with which is associated an injector 21 whose jet 22 is connected by a conduit 23 with a port of the valve body diametrically opposite the conduit 8 and whose suction chamber is connected, through a conduit 24 with the port of the valve body diametrically opposite to the conduit 14.

With the valve rotor 11 in the spray position, as indicated in Figure 1, the pump 17 will draw liquid from the tank 18, force it through the constant pressure regulator 16, the conduit 14, the duct 12, and into the boom 6 to be discharged from the various spray nozzles 7.

When it is desired to stop spraying coincident with stoppage of movement or passage of the boom 6 across or beyond the border of the area being sprayed, the valve rotor 11 is quickly manually rotated by the operator through an arc of substantially ninety degrees so as to place the valve rotor in the position shown in Figure 2 wherein the stream of fluid under pressure issuing from the pump is discharged into the duct 13 and the boom 6 is brought into communication with the duct 12. The pressure stream from the pump thus instantly starts discharging through the injector jet 22 into the return line 19 to the tank 18 and consequently will immediately create a forceful suction in the conduit 24 and also in the boom 6 which will quickly evacuate the nozzle 7, the boom 6 and the ducts 8, 12, and 24 in communication therewith of any fluid contained therein and return said fluid to the storage tank 18. It will therefore be seen that, due to the rapidity that the boom is cleared of solution, the chances of drippage occurring from any or all of the nozzles 7 is reduced to an absolute minimum. When spraying is to be again resumed, the simple operation of rotating the valve rotor to its original position of Figure 1 will admit solution under pressure into the boom to be discharged through the various spray nozzles. It will also be seen that the reversed forceful flow of liquid in the conduits and nozzles will effect dislodging of any solid particles or matter which may be lodged in the nozzles or filters with which the apparatus may be equipped thereby clearing these elements for subsequent fully efficient operation. In addition, after the liquid has been evacuated from the conduits and nozzles, the injector will draw considerable air into the system which, when it reaches the storage tank, will effect a desirable agitation of the liquid contained therein. This is particularly beneficial when mixtures are being employed which, if quiescent, have a tendency to precipitate solid matter therefrom.

The arrangement of apparatus shown in Figure 1 may be used with comparatively small pumps where the maximum output of the latter must be utilized to provide maximum operating pressure in the boom or to afford sufficient volume of flow at adequate pressure in the event that an extra-long boom having an increased number of spray nozzles is employed. In Figures 3 and 4 I have shown an arrangement of apparatus designed to function with pumps having a comparatively greater pumping capacity. In this array, most of the components are the same as those employed in the structure of Figure 1 with the exception of the construction of the control valve 9 and a slight modification of the circuit. Here the valve utilizes the same four-port body but the rotor 26 is altered to provide a main passage 27, extending diametrically through the rotor, and a branch passage 28 which rectangularly intersects the main passage. The boom 6, in this arrangement, is connected by the conduit 8 to one port of the valve body while the pressure line 14 from the pump is connected to the next port in clockwise adjacency to the port of the conduit 8. The valve body port diametrically opposed to the conduit 14 is connected by a conduit 29 with the jet 22 while the valve port opposite the conduit 8 is stopped with a plug 31 or, if desired, a valve body having only three ports may be employed. The discharge of the injector 21 is directed by the conduit 19 back into the storage tank and the suction chamber of the injector is connected by a conduit 32 with the boom supply conduit 8.

When the apparatus is in condition for spraying, the valve rotor occupies the position shown in Figure 3 wherein the jet conduit 29 is closed off and passages 27 and 28 are aligned, respectively, with the conduits 8 and 14. This allows fluid under pressure to flow from the pump 17 into the boom 6. It will be noted that since the conduit 32 is in communication with the conduit 8, in which the fluid under pressure is flowing, some fluid will enter the conduit 32, pass through the injector and the conduit 19 and thus find its way back into the storage tank 18. However, the flow of fluid moving through the conduit 32 will be considerably choked and thereby impeded by the injector and consequently the bulk of the pump discharge will enter the boom with adequate pressure to operate the several spray nozzles thereof in the proper manner. When spraying is to be stopped for the reason stated above, the valve rotor is revolved through substantially ninety degrees to the position shown in Figure 4 wherein the conduit 8 is shut off and the main passage 27 of the rotor interconnects the supply conduit 14 and the jet conduit 29. This causes the discharge of the pump to be passed directly through the jet 22 thus inducing suction in the conduit 32 and the boom 6 which will rapidly evacuate the boom as explained previously.

Figure 5:
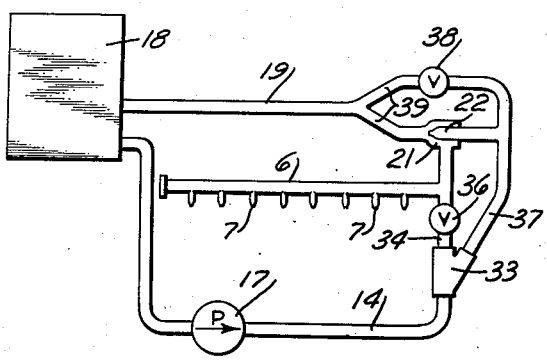
Figure 5 is a diagrammatic view showing a further modified form of the apparatus of my invention, the parts being shown in fluid-spraying condition.

In Figure 5 I have shown an arrangement of apparatus employing, for the most part, standard fittings and controls. Here the pressure supply conduit 14 from the pump 17 is connected with a Y fitting 33, the straight run of which is in communication with a continuation 34 of the conduit 14 and is connected with the boom conduit 6 and with the suction chamber of the injector 21. Preferably a quick-acting gate type valve 36 is included in the line 34 just beyond the fitting 33. The branch run of the fitting 33 is arranged to contain a filter, shown in detail in Figure 6 and communicates through a conduit 37 with the jet 22 of the injector and with a shut-off valve 38 similar to the valve 36. Both the outlet of the injector and the valve 36 are connected by converging lines 39 with the return conduit 19 to the storage tank 18.

During operations when solution is to be discharged from the spray nozzles 6, the valve 36 is opened and the valve 38 is regulated to give the desired amount of discharge from the spray nozzles. During such operations, fluid may flow through the injector and its jet, but since the pressure will be reduced, due to divergence of the pump output through the conduits 34 and 37, the tendency of the injector to draw fluid from the boom 6 will be minimized. However, when the valve 36 is fully closed, an added flow of fluid will be diverted through the injector jet thereby causing evacuation of the boom 6 as aforesaid.

Figure 6:
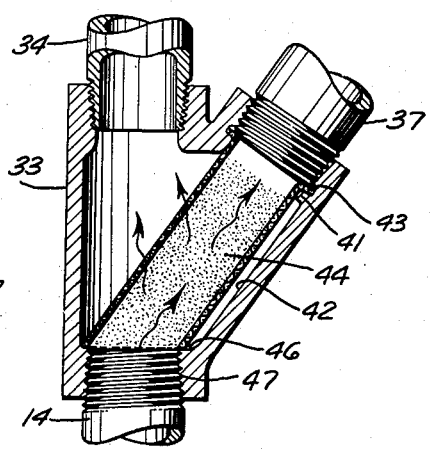
Figure 6 is an enlarged vertical sectional view of the by-pass fitting of Figure 5.

The illustration of Figure 6 shows the Y-fitting 33 in the branch portion thereof, having an internal shoulder 41, or the like, in the bore 42 thereof which serves as a seat for the flanged end 43 of a tubular-shaped strainer 44 which extends downwardly to traverse the run of the fitting and seat against a shoulder 46 which borders the inner end of the lower threaded inlet 47 of the fitting. The flow of fluid through the Y-shaped by pass fitting is constantly from the bottom end thereof, as indicated by the flow arrow, and divides in the fitting to flow in the run and in the branch thereof. It will be noted that the fluid stream which enters the run is forced to flow through the strainer leaving any large particles or other foreign matter which may be entrained therein entrapped on the strainer. The flow which passes into the branch duct constantly washes across the strainer and effectively dislodges the entrapped matter which is then carried by the branch stream back into the storage tank. The apparatus of my invention is therefore capable of operating efficiently over long periods of time without requiring shutdowns to clear the system of matter which may foul or clog it.

In all modifications of the invention, the operation of shutting off the spray immediately brings the anti-drip mechanism into action and the transition is so rapid that not only will the discharge of fluid through the nozzles cease instantly but the institution of vacuum in the boom will occur so rapidly thereafter that little or no fluid will subsequently escape through the nozzles and consequently no dripping will take place.

I claim:

1. In a fluid spray apparatus having storage means for a liquid substance, a discharge device for said liquid including a discharge conduit associated therewith, a pump connected with and to draw liquid from said storage tank, a by-pass conduit connected to said pump, suction-establishing means in said by-pass conduit and actuated by the flow of liquid therethrough, a suction conduit connected with said suction-establishing means and in communication with said discharge conduit, a return conduit connected to said tank, means for simultaneously directing portions of said liquid into said discharge conduit and into said by-pass conduit, means including a valve member associated with said by-pass conduit for simultaneously directing portions of said liquid into said return conduit and into said suction establishing means in one position of said valve member, and for directing all of the liquid in said by-pass conduit into said suction establishing means in another position of said valve member, and valve means for preventing flow of liquid into said discharge conduit whereby said suction-establishing means will evacuate liquid from said suction conduit and said discharge device.

2. In a spray apparatus, the combination of a storage tank for a liquid, a pump connected with and to draw liquid from said storage tank, a Y-shaped distributor means for directing liquid under pressure into a first conduit and a second conduit, valve means for selectively opening and closing said first conduit, a discharge device for said liquid including a discharge conduit associated therewith, means connecting said discharge conduit with said first conduit, said second conduit connected to said tank and through which liquid may flow to re-enter said tank, suction-establishing means in said second conduit and actuated by the flow of liquid therethrough, means including a valve associated with said second conduit for directing portions of said liquid to said tank and by-passing said liquid around said suction-establishing means, a conduit interconnecting said discharge conduit and said suction-establishing means, said suction establishing means completely evacuating said discharge device and returning the evacuated liquid to said tank when said first conduit is closed by said valve means.

CLARENCE BUYER COLEMAN.

References Cited in the file of this patent

UNITED STATES PATENTS

| Number | Name | Date |
| --- | --- | --- |
| 1,987,649 | Wertz | Jan. 15, 1935 |
| 2,013,431 | Bechtold | Sept. 3, 1935 |
| 2,017,345 | Granberg | Oct. 15, 1935 |
| 2,415,019 | McMahan | Jan. 28, 1947 |
| 2,537,266 | Granberg | Jan. 9, 1951 |